(12) United States Patent
Liu et al.

(10) Patent No.: US 9,594,441 B2
(45) Date of Patent: Mar. 14, 2017

(54) STYLUS

(71) Applicant: Quanta Computer Inc., Taoyuan (TW)

(72) Inventors: Yun-Cheng Liu, Taipei County (TW); Wan-Chi Lin, Taichung (TW); Tao-Feng Chen, Taipei (TW); Bo-Chun Hsu, Taipei (TW)

(73) Assignee: Quanta Computer Inc., Taoyuan (TW)

( * ) Notice: Subject to any disclaimer, the term of this patent is extended or adjusted under 35 U.S.C. 154(b) by 170 days.

(21) Appl. No.: 14/619,708

(22) Filed: Feb. 11, 2015

(65) Prior Publication Data

US 2015/0317000 A1    Nov. 5, 2015

(30) Foreign Application Priority Data

May 1, 2014  (TW) .............................. 103115724 A (51) Int. Cl.
| | |
|---|---|
| *G06F 3/0354* | (2013.01) |
| *B43K 25/02* | (2006.01) |
| *B43K 5/16* | (2006.01) |
| *B43K 24/10* | (2006.01) |
| *B43K 24/04* | (2006.01) |
| *B43K 29/00* | (2006.01) |
| *B43K 23/12* | (2006.01) |
| *B43K 24/02* | (2006.01) |

(52) U.S. Cl.
CPC ............ *G06F 3/03545* (2013.01); *B43K 5/16* (2013.01); *B43K 25/028* (2013.01); *B43K 23/128* (2013.01); *B43K 24/026* (2013.01); *B43K 24/04* (2013.01); *B43K 25/026* (2013.01); *B43K 29/003* (2013.01)

(58) Field of Classification Search
CPC ... G06F 3/03545; B43K 29/00; B43K 29/003; B43K 27/006; B43K 25/028; B43K 24/04; B43K 24/026; B43K 24/00; B43K 23/128; B43K 23/12; B43K 23/00; B43K 7/12; B43K 5/16; B43K 3/04; B43K 1/088; B43K 1/00; B43K 29/10; B43K 25/026
USPC .......................................... 345/179
See application file for complete search history.

(56) References Cited

U.S. PATENT DOCUMENTS

| | | | | |
|---|---|---|---|---|
| 9,207,811 | B2* | 12/2015 | Hou ...................... | G06F 3/0421 |
| 2004/0140963 | A1* | 7/2004 | Kim ...................... | G06F 3/0325 |
| | | | | 345/179 |
| 2006/0028457 | A1* | 2/2006 | Burns .................... | G06F 3/0421 |
| | | | | 345/179 |
| 2007/0188479 | A1 | 8/2007 | Wang et al. | |

(Continued)

FOREIGN PATENT DOCUMENTS

| | | |
|---|---|---|
| CN | 100392557 C | 6/2008 |
| CN | 101719027 A | 6/2010 |

(Continued)

*Primary Examiner* — Julie Anne Watko
(74) *Attorney, Agent, or Firm* — Rabin & Berdo, P.C.

(57) ABSTRACT

A stylus includes a casing comprising an opening, a push rod disposed in the casing, a pen head fixed on an end of the push rod, a reflector coupled to the push rod, and a linkage mechanism disposed in the casing. At least a part of the pen head is exposed of the casing. An end of the linkage mechanism is fixed on the casing. The linkage mechanism connects reflector to the push rod, such that when the pen head is pushed into the casing, a moving distance of the reflector is greater than that of the pen head, and the reflector is exposed of the opening.

10 Claims, 11 Drawing Sheets

(56) References Cited

U.S. PATENT DOCUMENTS

| | | | |
|---|---|---|---|
| 2010/0141593 A1* | 6/2010 | Park | G06F 3/0421 345/173 |
| 2014/0232699 A1* | 8/2014 | Viswanathan | G06F 3/0386 345/179 |
| 2014/0362022 A1* | 12/2014 | Latella | G06F 3/03545 345/174 |
| 2015/0338933 A1* | 11/2015 | Holz | G06F 3/0304 345/179 |
| 2016/0018947 A1* | 1/2016 | Lin | G06F 3/03545 345/175 |
| 2016/0026362 A1* | 1/2016 | Chavez | G06F 3/012 345/419 |

FOREIGN PATENT DOCUMENTS

| | | |
|---|---|---|
| TW | 201339906 A | 10/2013 |
| TW | M467941 U | 12/2013 |

\* cited by examiner

STYLUS

RELATED APPLICATIONS

This application claims priority to Taiwan Application Serial Number 103115724, filed May 01, 2014, which is herein incorporated by reference.

BACKGROUND

Field of Invention

The present invention relates to a stylus. More particularly, the present invention relates to a stylus utilized in a reflective type optical touch device.

Description of Related Art

Touch technology refers to a combination of display and input modules of an electronic device. A user can control the electronic device simply by pressing or touching the display. The touch screen is normally categorized into three types, resistive type, capacitive type, and optical type. For the optical touch screen, because there are no traces used for sensing being disposed between the glass and the panel, this type of the touch screen may have a cost advantage when utilized as a large-size touch screen.

The light sources and the receivers of the optical touch screen are disposed on the edges or the corners of the screen. These light sources emit light, which in this case is invisible, such as an infrared ray, above the screen. When a user touches the screen, an infrared ray with a specified direction is blocked, in such a way that the receiver would not receive the blocked infrared ray in the specified direction. Therefore, the position where the screen is touched can be located after calculation.

In most of optical touch screens, the images are detected by reflecting light. Therefore, there is a need to reveal the reflecting portion of the stylus only when the pen head of the stylus touch the touch surface.

SUMMARY

The invention provides a stylus utilized in a reflective type optical touch device.

An aspect of the invention provides a stylus, which includes a casing comprising an opening, a push rod disposed in the casing, a pen head fixed on an end of the push rod, a reflector coupled to the push rod, and a linkage mechanism disposed in the casing. At least a part of the pen head is exposed of the casing. An end of the linkage mechanism is fixed on the casing. The linkage mechanism connects reflector to the push rod, such that when the pen head is pushed into the casing, a moving distance of the reflector is greater than that of the pen head, and the reflector is exposed of the opening.

In some embodiments, the stylus further includes a baffle disposed in the casing, a sleeve fixed at another end of the push rod, and a spring wrapped to the sleeve and disposed between the push rod and the baffle. The reflector is pushed and hidden in the casing when the pen head is pushed outward by an elastic force generated by the spring.

In some embodiments, the sleeve has a cavity, and the push rod is coupled to the cavity.

In some embodiments, the sleeve has a support flange, and the spring is disposed between the support flange and the baffle.

In some embodiments, the linkage mechanism includes a first linkage, two second linkages, a third linkage, and a fourth linkage. The first linkage has a first pivot end and a second pivot end opposite to each other, and two first pivot portions disposed between the first pivot end and the second pivot end. The second linkages respectively connect the first pivot portions to the push rod. The third linkage is connected to the reflector. The fourth linkage connects the third linkage to the second pivot end.

In some embodiments, the push rod has two second pivot portions, and the second linkages respectively connect the first pivot portions to the second pivot portions.

In some embodiments, the casing has a third pivot portion, and the first pivot end is coupled to the third pivot portion.

In some embodiments, a distance between the second pivot end and the first pivot portions is even to or greater than a distance between the first pivot end and the first pivot portions.

In some embodiments, the third linkage is coupled to the push rod.

In some embodiments, the third linkage is made of a light-absorbing material.

The stylus of the present disclosure can be utilized in a reflective type optical touch screen. When the stylus touches the touch surface, the pen head is pushed and linkage mechanism is operated, such that the reflector within the casing is revealed at the openings. Therefore, the light is reflected by the reflector only when the stylus touches the touch surface for operating, and the situation of misjudge can be prevented. Furthermore, by using the linkage mechanism, the moving distance of the reflector is greater than the distance of the pen head being pushed into the casing. The space of the stylus can be saved and the operation is friendly to the users.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1A:
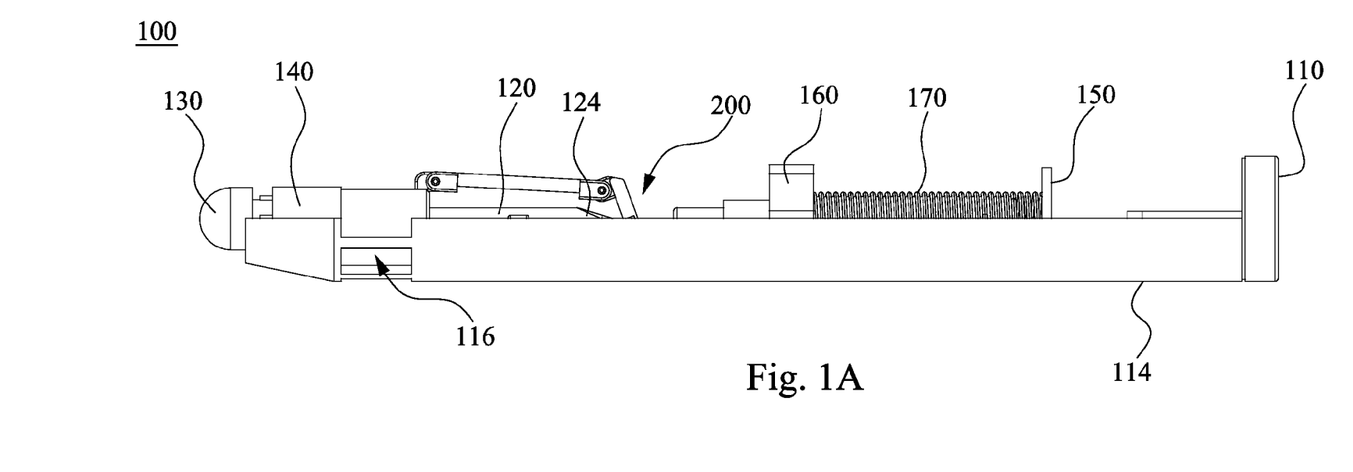
FIG. 1A and FIG. 1B are schematic views of different operation states of an embodiment of the stylus of the invention.
Figure 1B:
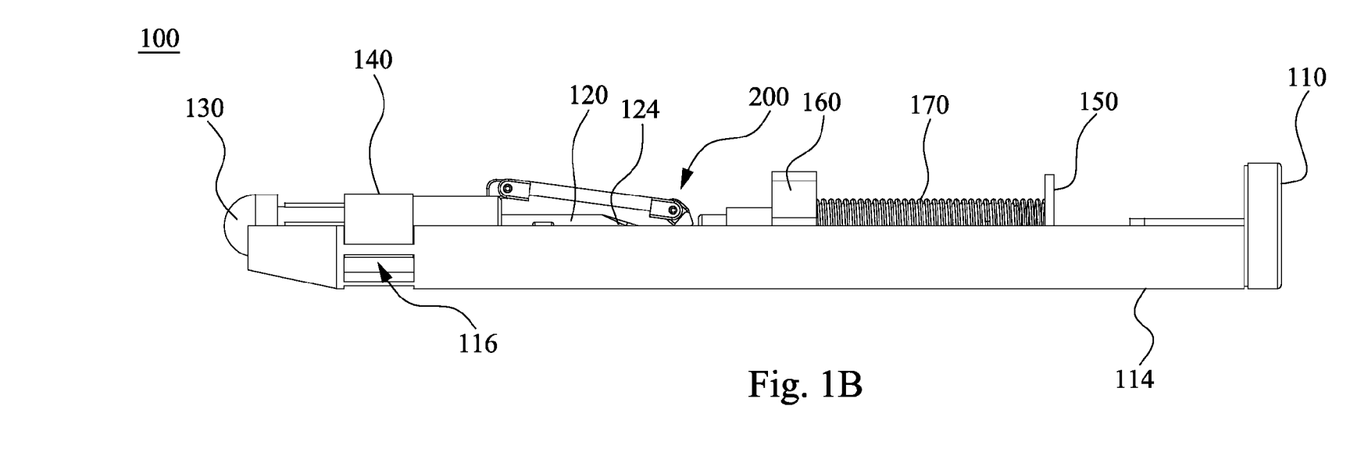

FIG. 1A and FIG. 1B are schematic views of different operation states of an embodiment of the stylus of the invention. The stylus includes a casing 110, a push rod 120, a pen head 130, a reflector 140, and a linkage mechanism 200. The casing 110 includes a top cover (not shown) and a bottom cover 114. The casing 110 includes plural openings 116. The openings 116 are basically located at the connecting portion of the pen head and the pen body. The openings 116 are arranged as a ring.

The push rod 120 is disposed in the casing 110, and the push rod 120 has a first end (not shown) and a second end 124 opposite to each other. The pen head 130 is fixed on the first end of the push rod 120, and at least a portion of the pen head 130 is exposed of the casing 110. The reflector 140 is coupled to the push rod 120. The linkage mechanism 200 is disposed in the casing 110. An end of the linkage mechanism 200 is fixed at the bottom cover 114 of the casing 110. The linkage mechanism 200 connects the reflector 140 to the push rod 120.

As shown in FIG. 1A, when the stylus 100 is not pushed or pressed, most of the pen head 130 is exposed of the casing 110, and the reflector 140 is hidden in the casing 110 and cannot be viewed through the openings 116 of the casing 110.

As shown in FIG. 1B, when the stylus 100 is pushed or pressed, for example, when the pen head 130 touches the touch surface, the pen head 130 goes into the casing 110. Meanwhile, the reflector 140 is slid on the push rod by the linkage mechanism 200, and the reflector 140 is revealed at the openings 116 of the casing 110.

The openings 116 have a predetermined size to distinguish whether the reflector 140 is hidden in the casing 110 or exposed of the openings 116, such that the moving distance of the reflector 140 is increased while the size of the openings 116 is increased. However, the space for the pen head 130 to insert or move into the casing 110 is limited. Therefore, the present disclosure utilizes the linkage mechanism 200, such that the moving distance of the reflector 140 is greater than the moving distance of the pen head 130 when the pen head 130 is pushed into the casing 110. Thus the purpose of exposing the reflector 140 through the openings 116 when the pen head 130 is pushed into the casing 110 can be achieved.

The stylus 100 further includes a baffle 150 disposed in the casing 110, a sleeve 160 connected to the second end 124 of the push rod 120, and a spring 170. The spring 170 is wrapped to the sleeve 160 and is disposed between the baffle 150 and the push rod 120. When the pen head 130 is pushed into the casing 110 by an external force, the push rod 120 pushes the sleeve 160 and the spring 170, such that the spring 170 is pressed and deformed between the sleeve 160 and the baffle 150 thereby generating an elastic force. When the external force is not exist, the pen head 130 is pushed outward by the elastic force provided by the spring 170, and the reflector 140 is moved and hidden in the casing 110.

Figure 2:
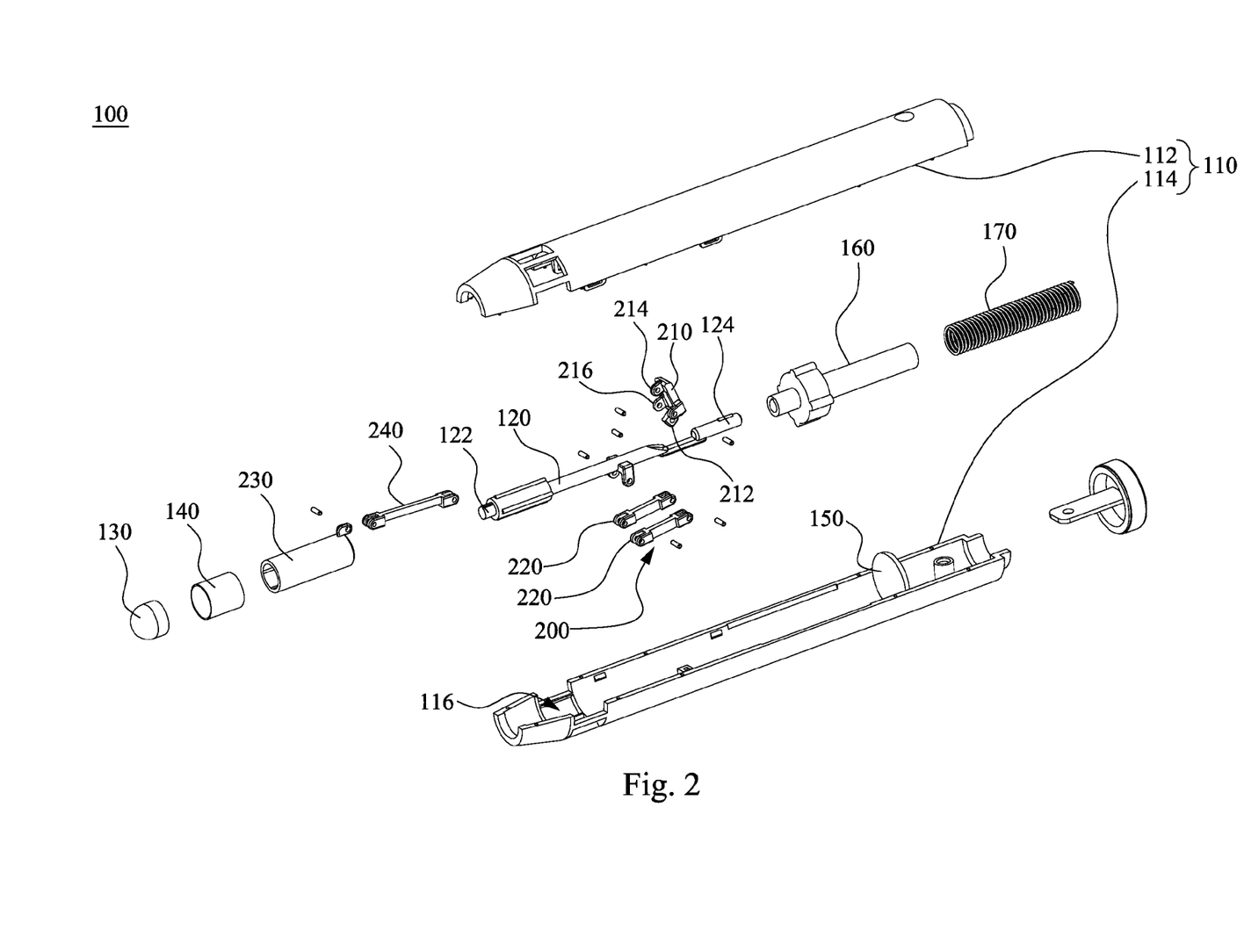
FIG. 2 is an explosion view of the stylus 100 in FIG. 1A.

FIG. 2 is an explosion view of the stylus 100 in FIG. 1A. The stylus includes the casing 110, the push rod 120, the pen head 130, the reflector 140, the baffle 150, the sleeve 160, the spring 170, and the linkage mechanism 200. The casing 110 includes the top cover 112 and the bottom cover 114. The casing 110 includes plural openings 116 located at the connecting portion of the pen head and the pen body as a ring.

The push rod 120 is disposed in the casing 110, and the push rod 120 has the first end 122 and the second end 124 opposite to each other. The pen head 130 is fixed on the first end 122 of the push rod 120, and at least a portion of the pen head 130 is exposed of the casing 110. The reflector 140 is coupled to the push rod 120. An end of the linkage mechanism 200 is fixed at the casing 110. The linkage mechanism 200 connects the reflector 140 to the push rod 120. The baffle 150 is disposed in the casing 110. The spring 170 is wrapped on the sleeve 160 and is disposed between the push rod 120 and the baffle 150.

The linkage mechanism 200 includes a first linkage 210, two second linkages 220, a third linkage 230, and a fourth linkage 240. The first linkage 210 has a first pivot end 212 and a second pivot end 214 opposite to each other, and two first pivot portions 216 disposed between the first pivot end 212 and the second pivot end 214. The first pivot end 212 is fixed at the bottom cover 114 of the casing 110. The second linkages 220 are disposed at opposite sides of the first linkage 210, and the second linkages 220 respectively connect the first pivot portions 216 to the push rod 120. The third linkage 230 is connected to the reflector 140. The third linkage 230 and the reflector 140 are coupled to the push rod 120 and are moved together with the push rod 120. In a preferred embodiment, the third linkage 230 is made of a light-absorbing material. The fourth linkage 240 connects the third linkage 230 to the second pivot end 214 of the first linkage 210.

Figure 3:
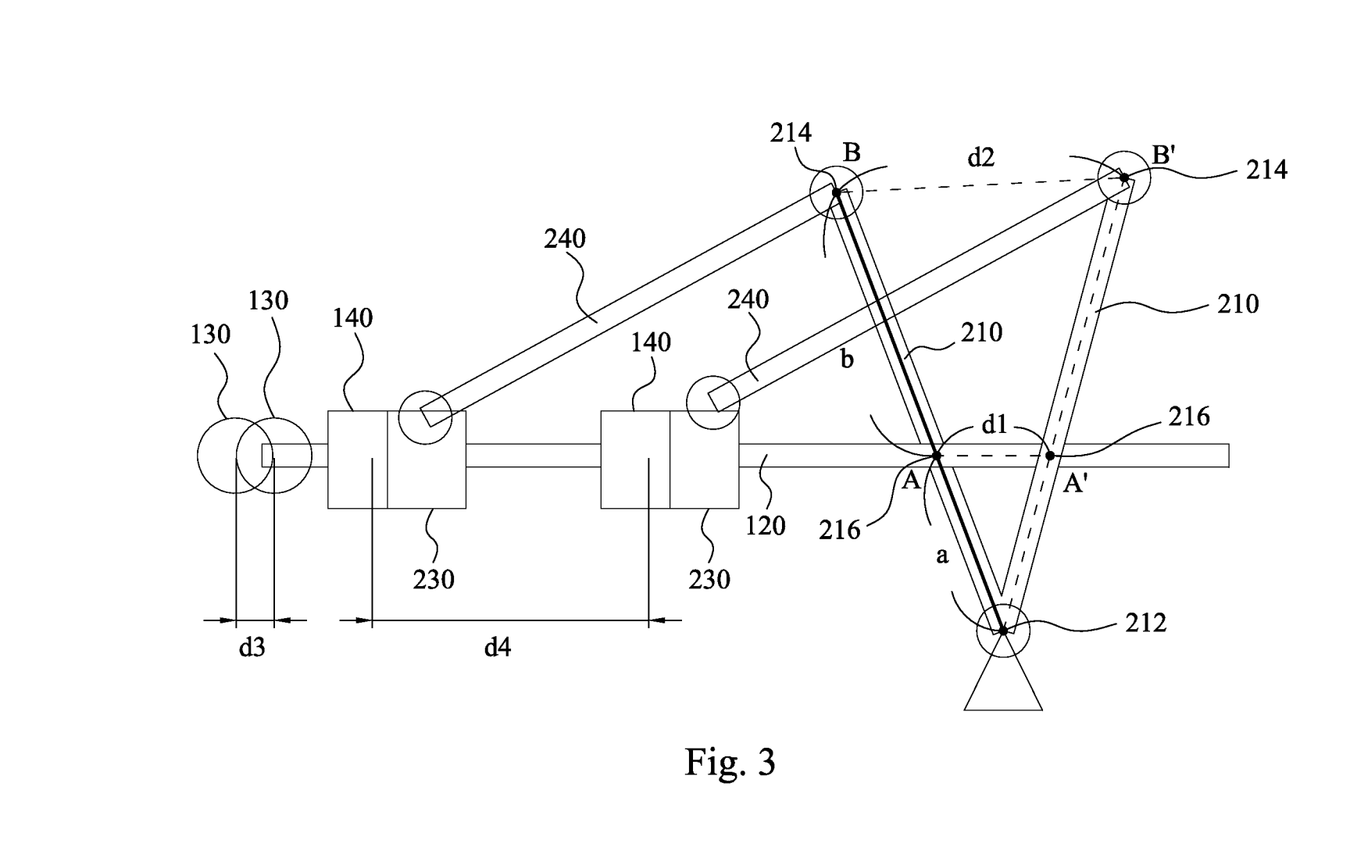
FIG. 3 is a schematic of an operation of the linkage mechanism utilized in the stylus of the invention.

FIG. 3 is a schematic of an operation of the linkage mechanism utilized in the stylus of the invention. In order to describe clearly, only the push rod 120, the pen head 130, the reflector 140, the first linkage 210, the third linkage 230, and the fourth linkage 240 are illustrated in FIG. 3, and the elements in FIG. 3 are simplified. The first linkage 210 is a one-piece formed structure. The first pivot end 212 of the first linkage 210 is fixed at the casing, and the first pivot end 212 is regarded as a fulcrum. The first pivot portions 216 of the first linkage 210 are connected to the push rod 120. The pen head 130 is fixed at an end of the push rod 120. The reflector 140 and the third linkage 230 are coupled to the push rod 120. The fourth linkage 240 connects the third linkage 230 to the first linkage 210.

The first pivot portion 216 is disposed between the first pivot end 212 and the second pivot end 214. There is a distance a between the first pivot portion 216 and the first pivot end 212. There is a distance b between the first pivot portion 216 and the second pivot end 214. When the pen head 130 and the push rod 120 are pushed, the first pivot portion 216 of the first linkage 210 is also moved from the position A to position A', and the second pivot end 214 is also moved from the position B to the position B'. As shown in the dotted line triangle in FIG. 3, the distance a is defined between the first pivot portion 216 and the first pivot end 212; the distance b is defined between the first pivot portion 216 and the second pivot end 214; a distance d1 is defined between the position A and position A'; a distance d2 is defined between the position B and the position B'. The distance b between the second pivot end 214 and the first pivot portion 216 is even to or greater than the distance a between the first pivot end 212 and the first pivot portion 216. The ratio of d2/d1 is equals to (a+b)/a, which is always greater than 1. Thus the moving distance d4 of the fourth linkage 240, the third linkage 230, and the reflector 140, which are connected to the second pivot end 214, is always greater than the moving distance d3 of the pen head and the push rod 120.

For example, in the linkage 210, when the ratio of the distance between the first pivot portion 216 to the first pivot end 212 to the distance between the first pivot portion 216 to the second pivot end 214 is 1:2, then d1:d2=d3:d4=1:3. Namely, by using the linkage mechanism, the moving distance (d4) of the reflector 140 can be increased since the moving distance (d3) of the pen head 130 is limited.

Figure 4A:
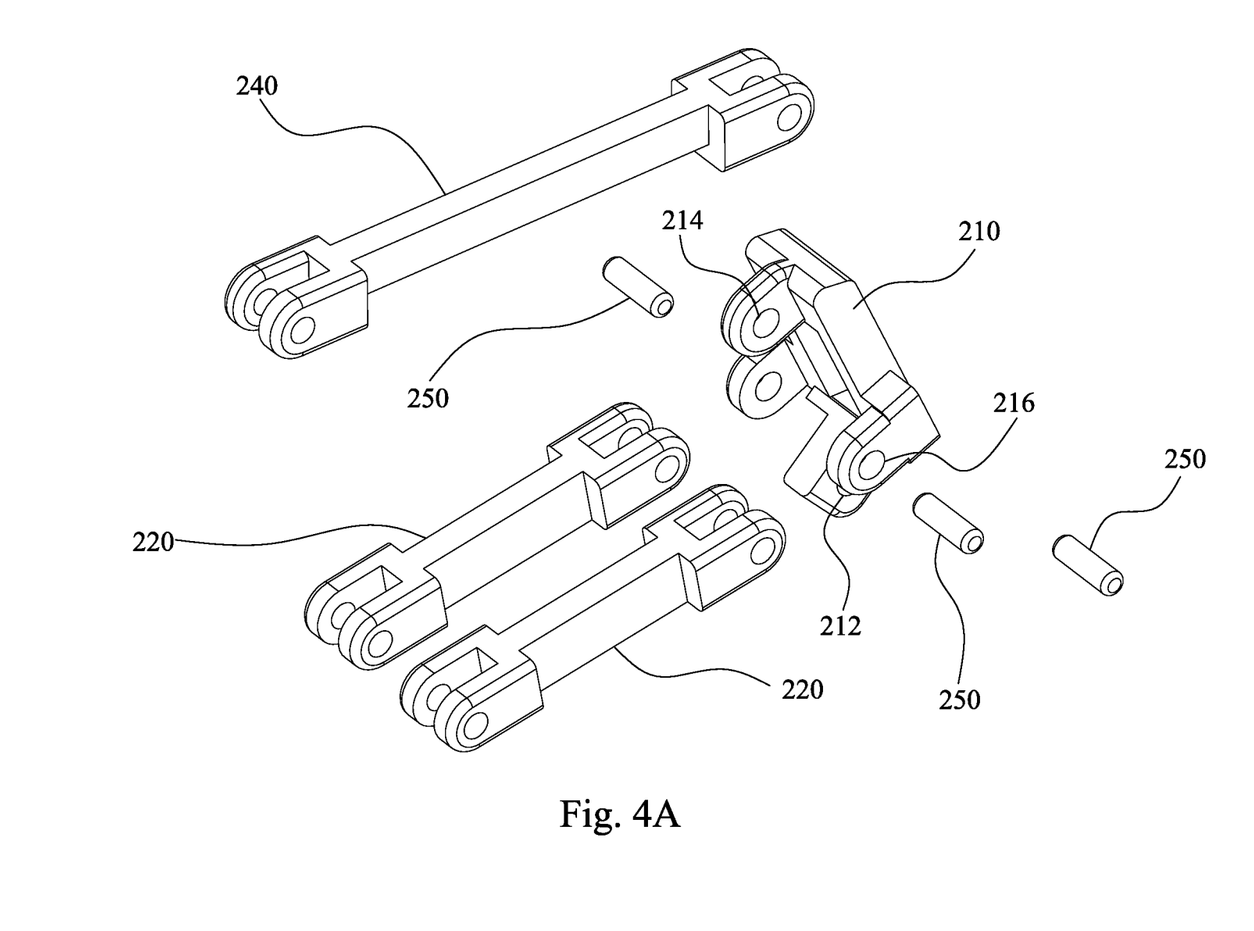
FIG. 4A to FIG. 4H are schematic view of different steps of assembling the stylus of FIG. 1A.

FIG. 4A to FIG. 4H are schematic view of different steps of assembling the stylus of FIG. 1A. Referring to FIG. 4A, the first linkage 210, the second linkages 220, and the fourth linkage 240 are assembled. The second pivot end 214 of the first linkage 210 is connected to the fourth linkage 240 via a shaft 250. The first pivot portions 216 are also connected to the second linkage 220 via the shafts 250.

Figure 4B:
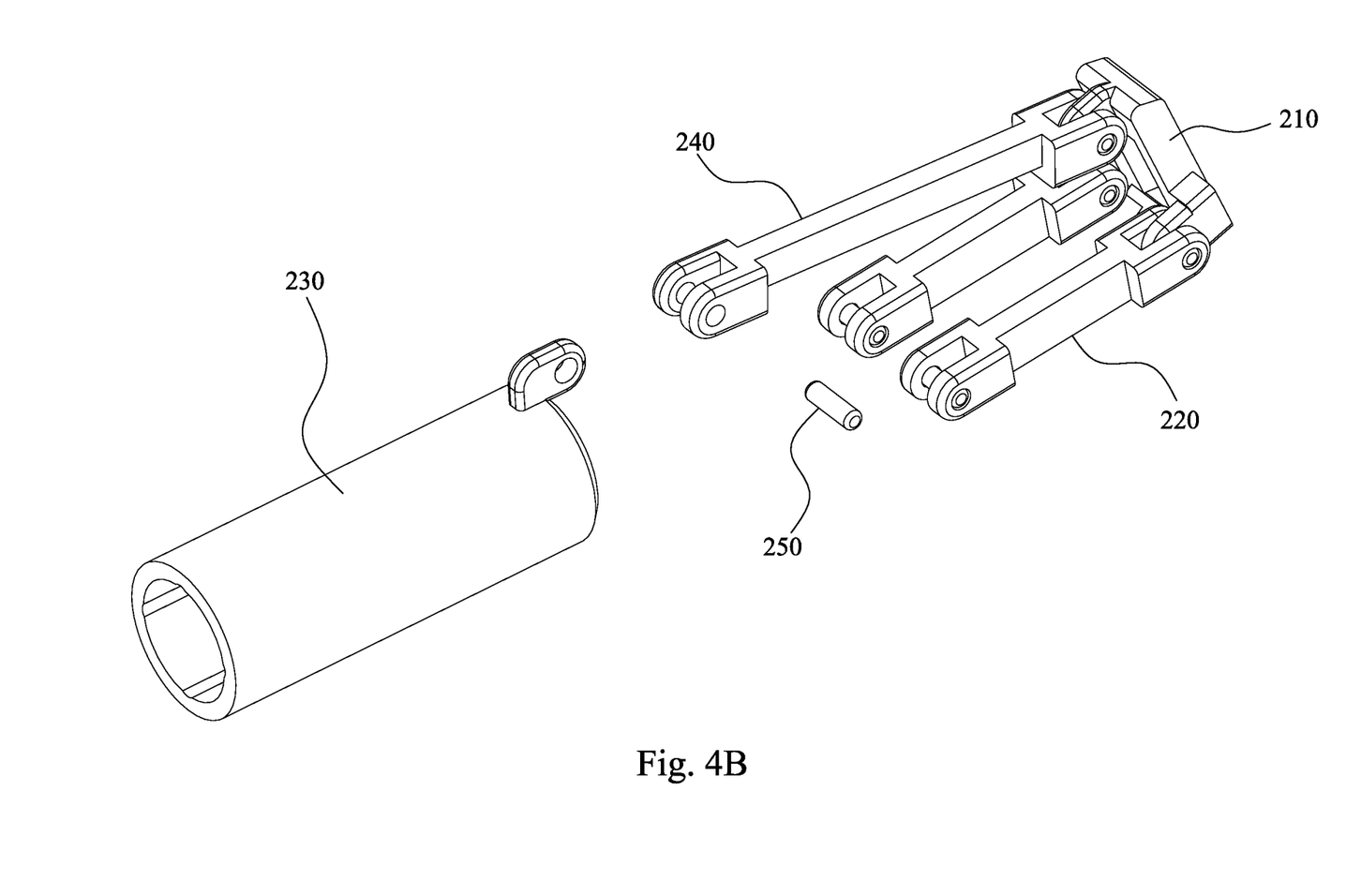

Referring to FIG. 4B, the assembly provided by FIG. 4A is assembled to the third linkage 230. The third linkage 230 is a hollow tube. The third linkage 230 is connected to the fourth linkage 240 via the shaft 250. The first linkage 210 and the third linkage 230 are respectively connected to opposite ends of the fourth linkage 240.

Figure 4C:
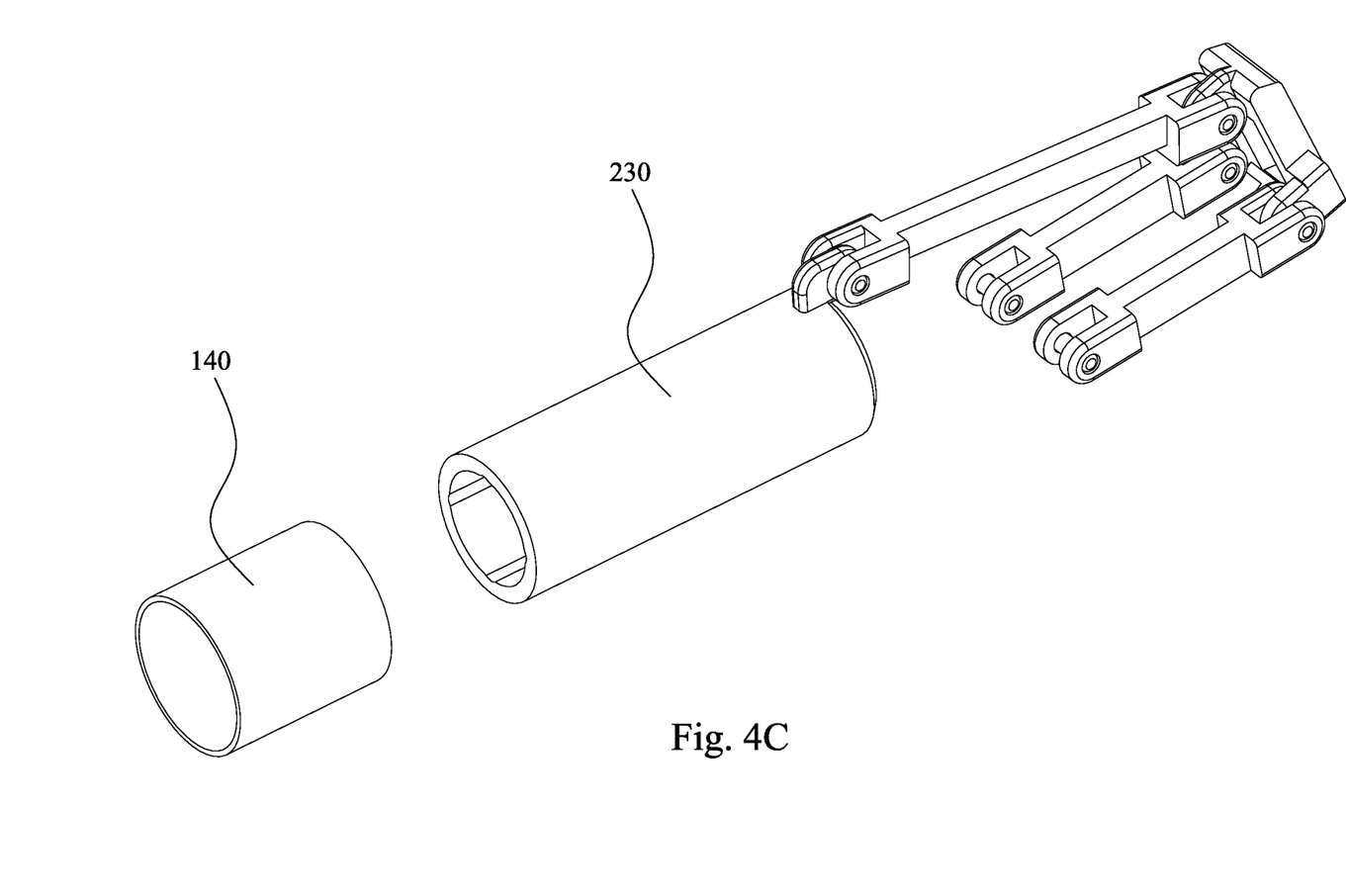

Referring to FIG. 4C, the reflector 140 is assembled with the third linkage 230. The reflector 140 is a tube coated with a reflective layer. The reflective layer can be white paint or metal layer. The reflector 140 can be adhered to the third linkage 230.

Figure 4D:
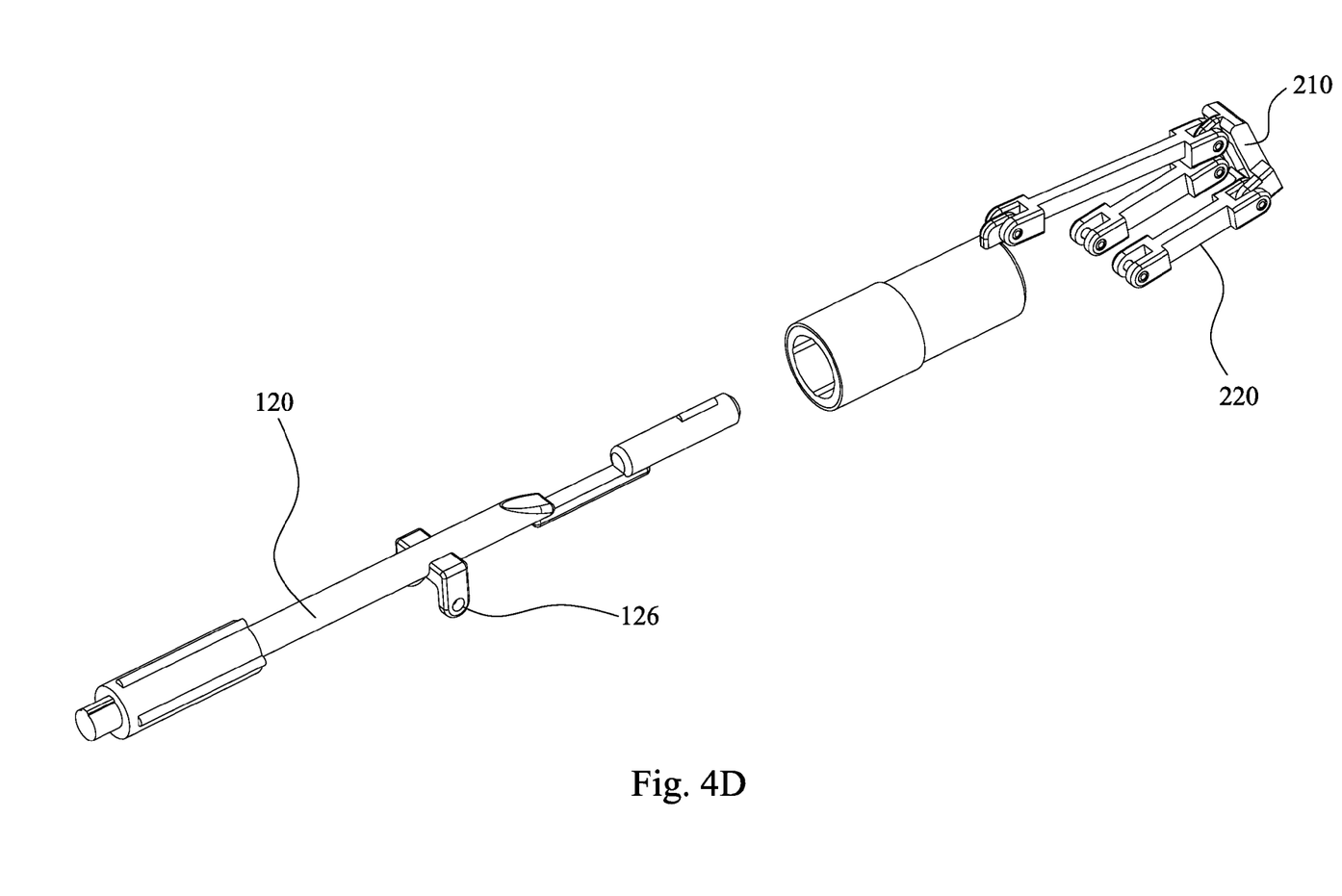

Referring to FIG. 4D, the push rod 120 is assembled to the assembly provided by FIG. 4C. More particularly, the push rod 120 has two pivot portions 126. The second linkages 220 are respectively connected to the second pivot portion 126 via shafts, thus the first linkage 210 and the push rod 120 are interconnected by the second linkages 220.

Figure 4E:
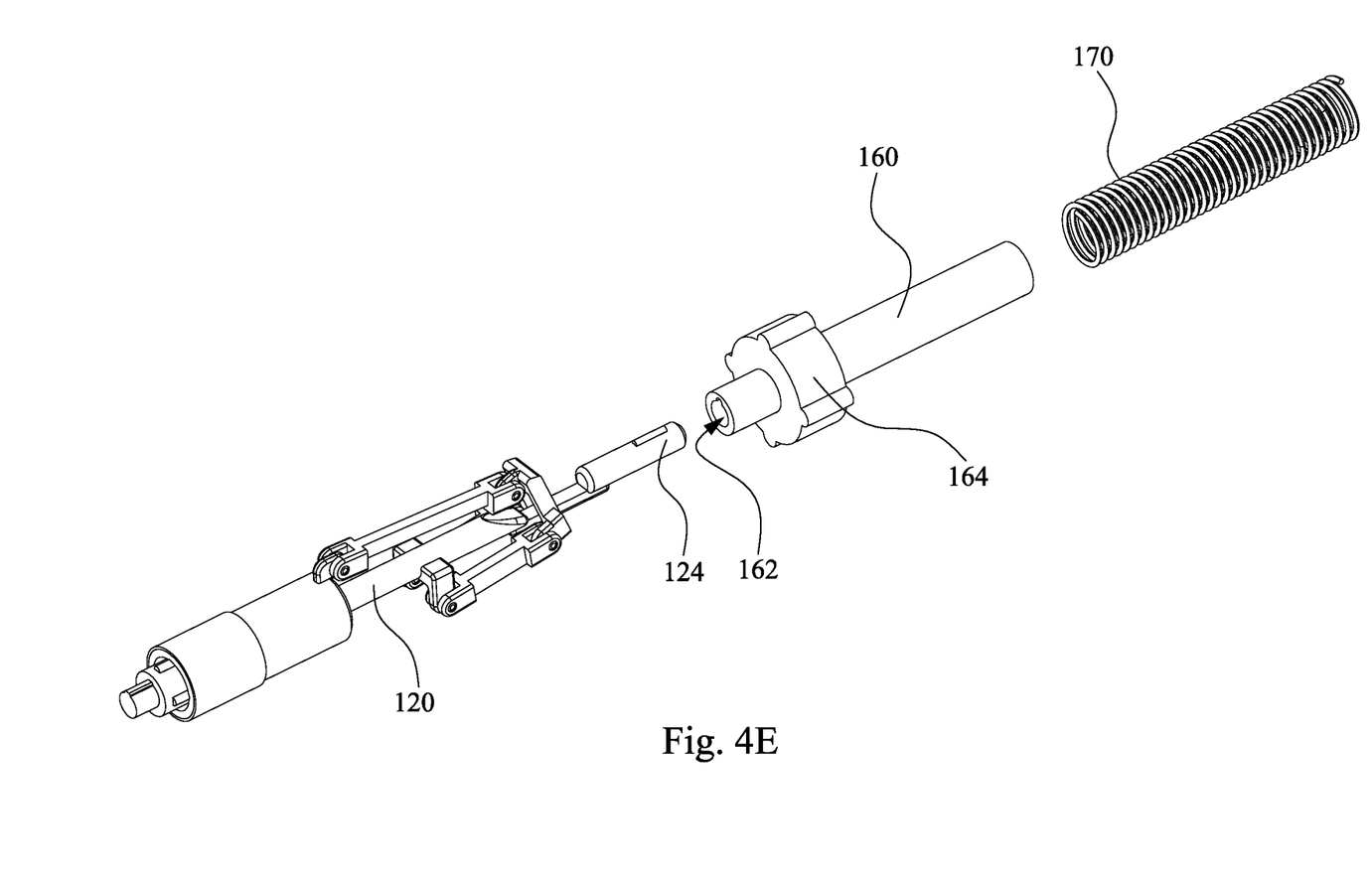

Referring to FIG. 4E, the sleeve 160 and the spring 170 are assembled to the assembly provided by FIG. 4D. The sleeve 160 has a cavity 162. The second end 124 of the push rod 120 is coupled to the cavity 162, such that the sleeve 160 is fixed on the push rod 120. The sleeve 160 has a support flange 164. The spring 170 is wrapped on the sleeve 160, and the support flange 164 is arranged between the push rod 120 and the spring 170.

Figure 4F:
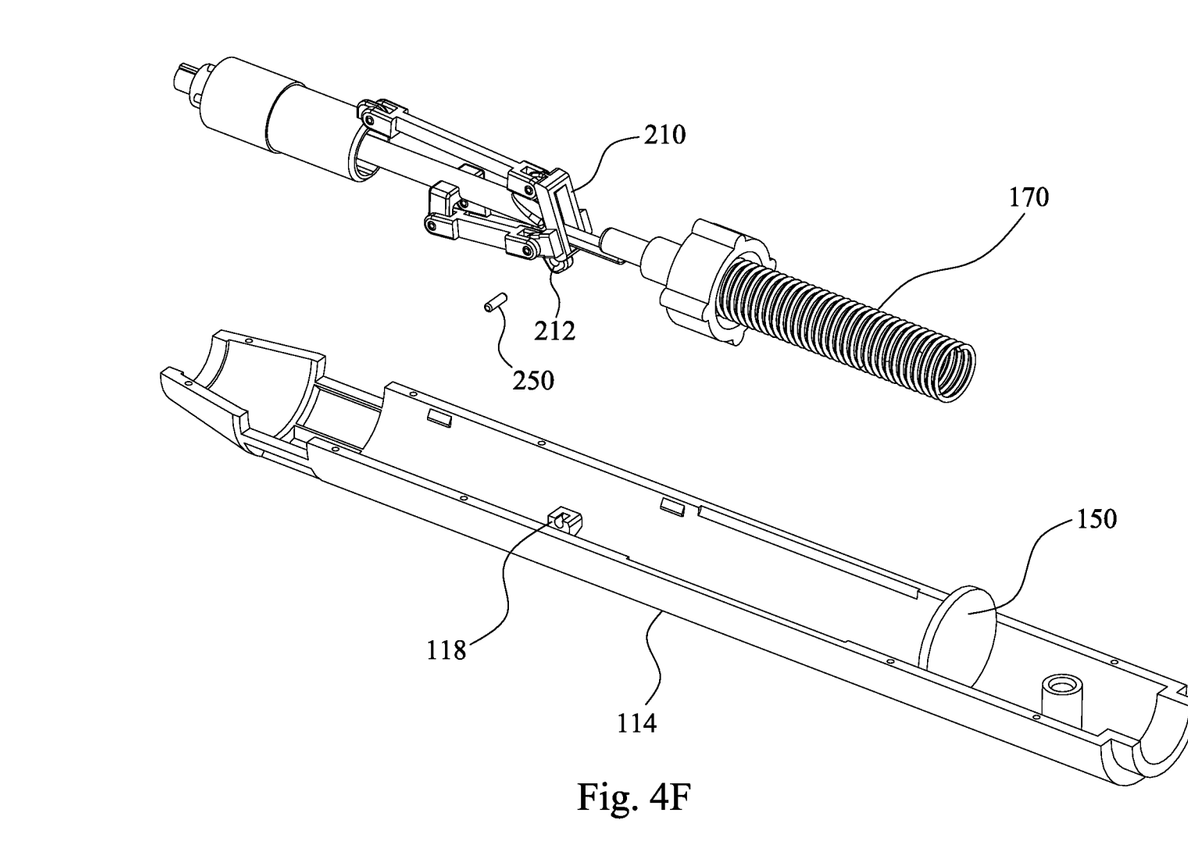

Referring to FIG. 4F, the assembly provided by FIG. 4E is placed into the casing. More particularly, the assembly provided by FIG. 4E is placed into the bottom cover 114 of the casing, and first pivot end 212 of the first linkage 210 is connected to a third pivot portion 118 of the bottom cover 114. The spring 170 is disposed against the baffle 150.

Figure 4G:
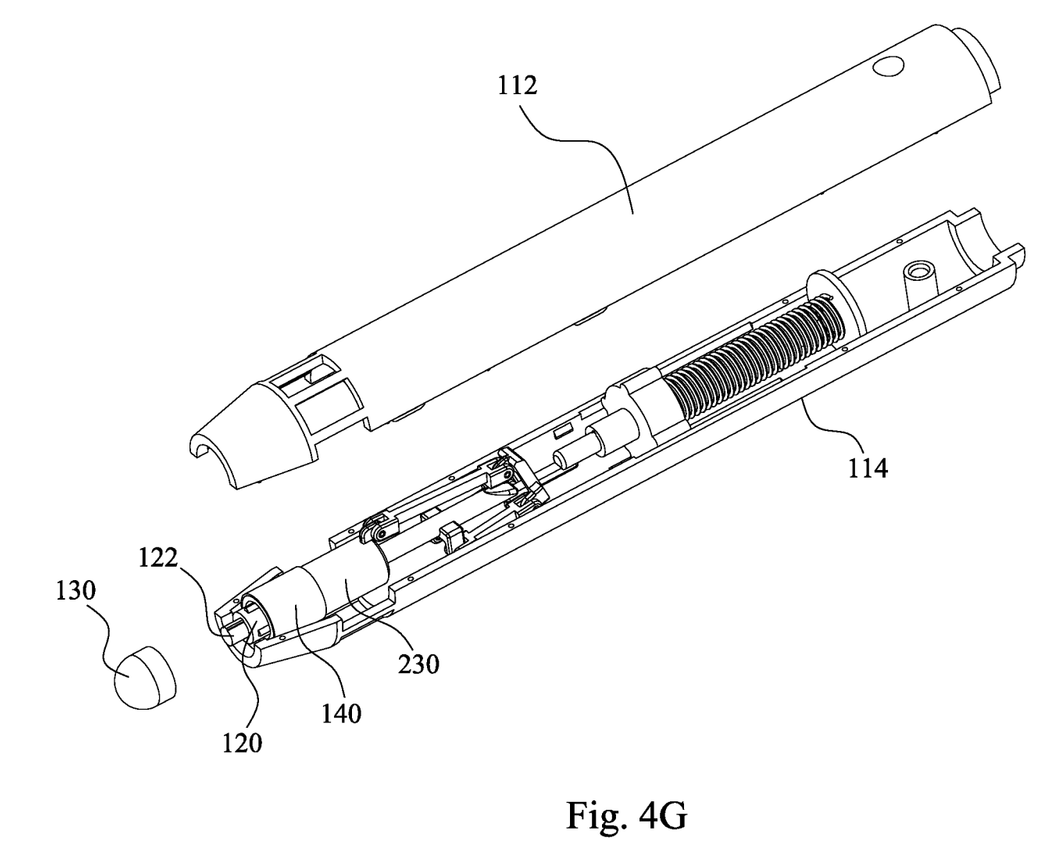

Referring to FIG. 4G, the assembly provided by FIG. 4F is assembled with the top cover 112 and the pen head 130. The pen head 130 is fixed on the first end 122 of the push rod 120. The top cover 112 and the bottom cover 114 are coupled to each other via coupling structures.

Figure 4H:
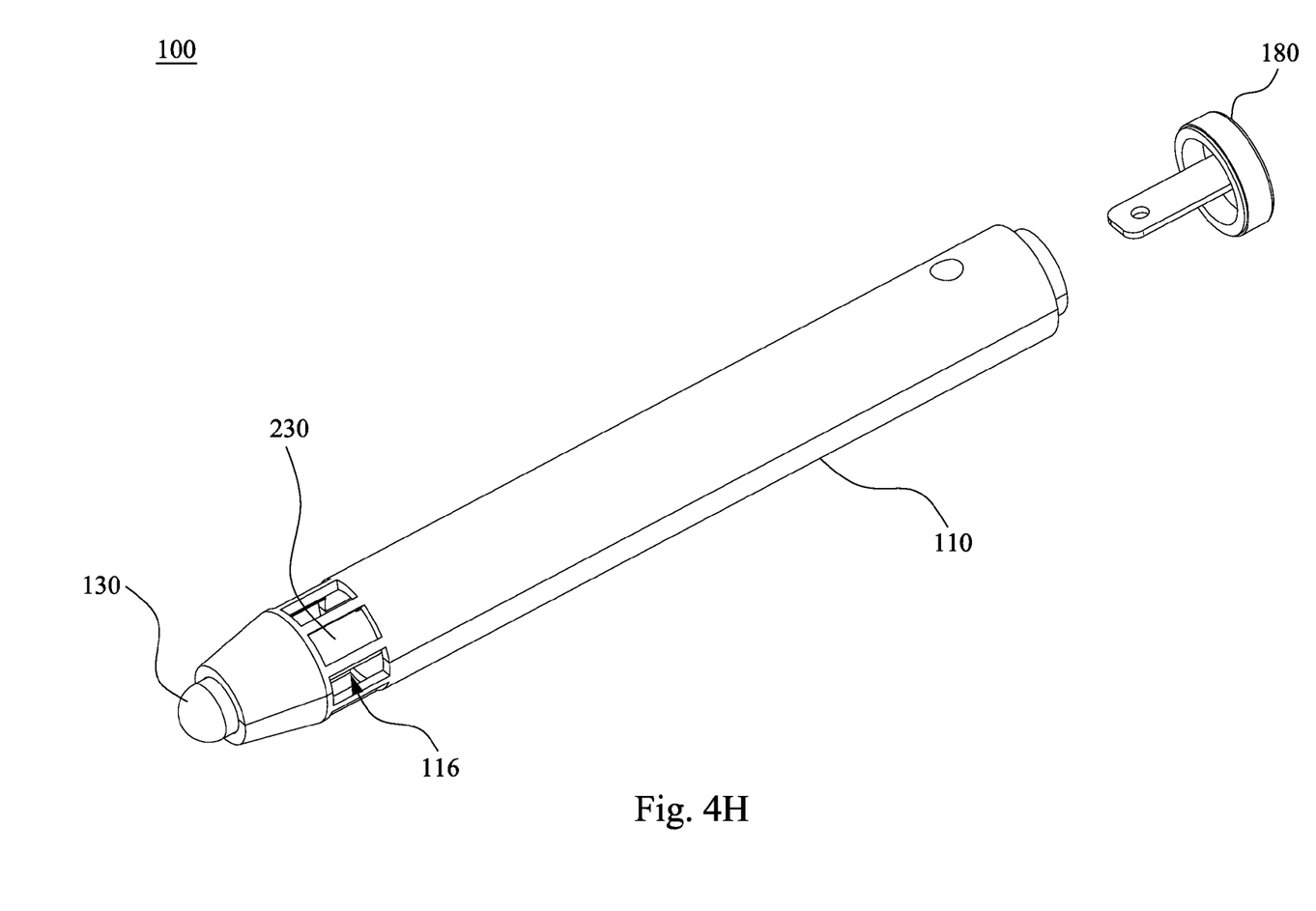

Referring to FIG. 4H, a cap 180 is coupled to the assembly provided by FIG. 4G, and the stylus 100 is provided. When there is no external force applied to the stylus, the pen head 130 is exposed of the casing 110, and the reflector 140 (see FIG. 4G) is hidden in the casing 110 since the third linkage 230 is exposed of the openings 116. In order to better distinguish the third linkage 230 from the reflector 140 when the images are captured, the third linkage 230 is made of material with low reflective index or light-absorbing material.

The stylus of the present disclosure can be utilized in a reflective type optical touch screen. When the stylus touches the touch surface, the pen head is pushed and linkage mechanism is operated, such that the reflector within the casing is revealed at the openings. Therefore, the light is reflected by the reflector only when the stylus touches the touch surface for operating, and the situation of misjudge can be prevented. Furthermore, by using the linkage mechanism, the moving distance of the reflector is greater than the distance of the pen head being pushed into the casing. The space for the stylus can be saved and the operation is friendly to the users.

Although the present invention has been described in considerable details with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A stylus, comprising:
   a casing comprising an opening;
   a push rod disposed in the casing;
   a pen head fixed on an end of the push rod, wherein at least a part of the pen head is exposed from the casing;
   a reflector coupled to the push rod; and
   a linkage mechanism disposed in the casing, wherein an end of the linkage mechanism is fixed on the casing, the linkage mechanism connects the reflector to the push rod, such that when the pen head is pushed into the casing, a moving distance of the reflector is greater than that of the pen head, and the reflector is exposed from the opening.

2. The stylus of claim 1, further comprising:
   a baffle disposed in the casing;
   a sleeve fixed at another end of the push rod; and
   a spring wrapped to the sleeve and disposed between the push rod and the baffle, such that the reflector is pushed and hidden in the casing when the pen head is pushed outward by an elastic force generated by the spring.

3. The stylus of claim 2, wherein the sleeve comprises a cavity, and the push rod is coupled to the cavity.

4. The stylus of claim 2, wherein the sleeve comprises a support flange, and the spring is disposed between the support flange and the baffle.

5. The stylus of claim 1, wherein the linkage mechanism comprises:
   a first linkage having a first pivot end and a second pivot end opposite to each other, and two first pivot portions disposed between the first pivot end and the second pivot end;
   two second linkages respectively connecting the first pivot portions to the push rod;
   a third linkage connected to the reflector; and
   a fourth linkage connecting the third linkage to the second pivot end.

6. The stylus of claim 5, wherein the push rod comprises two second pivot portions, and the second linkages respectively connect the first pivot portions to the second pivot portions.

7. The stylus of claim 5, wherein the casing comprises a third pivot portion, and the first pivot end is coupled to the third pivot portion.

8. The stylus of claim 5, wherein a distance between the second pivot end and the first pivot portions is even to or greater than a distance between the first pivot end and the first pivot portions.

9. The stylus of claim 5, wherein the third linkage is coupled to the push rod.

10. The stylus of claim 9, wherein the third linkage is made of a light-absorbing material.

* * * * *